United States Patent
Magonski et al.

(10) Patent No.: US 8,778,550 B2
(45) Date of Patent: Jul. 15, 2014

(54) BATTERY OF FUEL CELLS

(71) Applicant: Akademia Gorniczo-Hutnicza Im. Stanislawa Staszica, Krakow (PL)

(72) Inventors: Zbigniew Magonski, Krakow (PL); Barbara Dziurdzia, Krakow (PL)

(73) Assignee: Akademia Gorniczo-Hutnicza Im. Stanislawa Staszica, Krakow (PL)

( * ) Notice: Subject to any disclaimer, the term of this patent is extended or adjusted under 35 U.S.C. 154(b) by 0 days.

(21) Appl. No.: 14/057,001

(22) Filed: Oct. 18, 2013

(65) Prior Publication Data

US 2014/0113209 A1    Apr. 24, 2014

(30) Foreign Application Priority Data

Oct. 20, 2012    (PL) .......................................... 401300

(51) Int. Cl.
*H01M 8/04* (2006.01)
(52) U.S. Cl.
CPC ...... *H01M 8/04007* (2013.01); *H01M 8/04014* (2013.01)
USPC .......................................................... 429/439
(58) Field of Classification Search
CPC    H01M 8/04; H01M 8/04007; H01M 8/04014
USPC .......................................................... 429/439
See application file for complete search history.

(56) References Cited

U.S. PATENT DOCUMENTS

| | | | |
|---|---|---|---|
| 4,276,355 A | 6/1981 | Kothmann et al. | |
| 5,008,163 A | 4/1991 | Smith et al. | |
| 5,741,605 A * | 4/1998 | Gillett et al. | 429/415 |
| 6,051,329 A | 4/2000 | Fasano et al. | |
| 7,531,053 B2 | 5/2009 | Ide et al. | |
| 7,550,018 B2 * | 6/2009 | Zerfass et al. | 29/623.2 |
| 2008/0003484 A1 | 1/2008 | Chen et al. | |
| 2008/0038622 A1 * | 2/2008 | Valensa et al. | 429/38 |

FOREIGN PATENT DOCUMENTS

| | | |
|---|---|---|
| DE | 10 2007 024 226 A1 | 11/2008 |
| JP | 10308227 A | 11/1998 |
| PL | 388558 | 1/2011 |
| PL | 213349 B1 | 2/2013 |
| PL | 397753 A1 | 7/2013 |
| WO | 9215122 A1 | 9/1992 |

* cited by examiner

*Primary Examiner* — Jonathan Jelsma
(74) *Attorney, Agent, or Firm* — Matthias Scholl, PC; Matthias Scholl

(57) ABSTRACT

Battery of fuel cells comprises at least one stack of interconnected flat two-sided fuel cells arranged inside the thermally insulated chamber. Each two-sided cell is made in a form of a ceramic plate with individual connections for the supply and drainage of fluids and electric power output, and is equipped with the central ceramic anode structure with high electrical conductivity which, on both sides, has channels formed for distribution of fuel and operating channels covered with operating anode layers, which are then covered with solid electrolyte layers, cathode layers and cathode conductive layers. Each two-sided cell (DFC) makes mechanical contact with the neighboring two-sided cells (DFC) with flexible separators which enable transfer of the fuel and catalytic combustion products. Furthermore, inside the thermally insulated chamber, temperature-controlling elements are located, such as heaters, heat absorbers and devices forcing air circulation.

13 Claims, 5 Drawing Sheets

BATTERY OF FUEL CELLS

CROSS-REFERENCE TO RELATED APPLICATIONS

Pursuant to 35 U.S.C. §119 and the Paris Convention Treaty, this Application claims priority benefits to Polish Patent Application No. P.401300 filed on Oct. 20, 2012, the contents of which are incorporated herein by reference. Inquiries from the public to applicants concerning this document or the related application should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

This invention relates to a medium-power battery of fuel cells, which can be used as autonomous electricity generator or complementary power supply system for an individual household.

2. Description of the Related Art

High-temperature fuel cells achieve high efficiency in the process of converting chemical energy into electricity. One advantage of the converters is their quiet operation without mechanical vibrations and a favorable relationship of the unit weight and the dimensions to the electric power generated. It is expected that electrochemical converters will become supplementary parts of electricity generators which draw energy from renewable energy sources which are unable to provide continuous power output over a full 24-hour cycle, such as solar cells or wind turbines.

A typical high-temperature fuel cell contains solid electrolyte, which is usually based on yttrium-stabilized zirconia. On the opposite sides of the thin electrolyte layer are located the anode and the cathode. The electrodes are transparent to gases.

At high temperature, zirconia ceramics have strong ionic conductivity. Due to the difference in partial pressure of oxygen on both sides of the electrolyte, the electrolyte becomes polarized. The partial pressure difference is due to the fact that zirconia ceramics is permeable to oxygen ions only that are produced in the cathode layer during the decomposition of molecular oxygen and taking up free electrons from the cathode. Thus, the cathode is positively polarized, whereas on the anode side free electrons are liberated due to the reaction of the oxygen ions with fuel—hydrogen or carbon oxide—which, in turn, leads to negative polarization. Connecting an external electrical circuit to the electrodes will cause electric current to flow and balance the internal ionic current.

From Polish Pat. No. 213349, a fuel cell is known with a flat laminar ceramic substrate, the core of which is made of a central ceramic plate with high density and rigidity. The ceramic plate is permanently joined with porous cermet layers with distribution channels formed therein. The ceramic substrate so prepared has, on both sides on a part of the surface, layers of solid electrolyte applied and durably bonded to the substrate, which in turn, on a part of their surface, are covered with electrode layers. Such layers of solid electrolyte have their surfaces covered with contact layers. The description presents also applications of the cell in a converter for converting electrochemical to electrical energy, in which the battery of fuel cells is covered with foamed ceramic thermal insulation.

From U.S. Pat. Nos. 4,276,355 and 7,531,053, plate chemical to electrical energy converters are known, which contain multiple electrically connected fuel cells. The fuel cells are configured in a stack, whereby each ceramic structure of the cell is located between two plates. Each of the plates constitutes a separator between the adjacent ceramic structures and has, on both sides, open longitudinal channels for the passage of fuel and air. The fuel channels are arranged orthogonally in relation to the air flow channels. The separators referred to in U.S. Pat. No. 7,531,053 are made of stainless steel with linear thermal expansion coefficient close to that of the electrolyte.

One advantage of the plate converters is the relatively high value of electric power generated per volume of the unit of up to 5 kW/L. This enables the use of an insulated chamber having compact dimensions, which translates into relatively low heat loss, since the amount of distributed heat is proportional to the chamber area. However, the compact design of the batteries also makes it impossible for the batteries to be warmed up and cooled down. This parameter is particularly important in medium and high-power equipment because it may take up to 24 hours for a safe warm-up. With such a long start up time, the batteries of cells cannot serve as emergency or supplementary equipment during peak power consumption. Clearly much opportunity of improvement remains in this technological area.

SUMMARY OF THE INVENTION

The new design of battery of fuel cells proposed herein allows considerable reduction of the start-up time and, thus, can be useful particularly in applications requiring quick response to electric power shortages.

In one aspect, the invention provides a battery of fuel cells in which every two-sided cell is made in a form of a ceramic plate with individual connections for the supply and drainage of fluids and electric power output, and is equipped with a central ceramic anode structure with high electrical conductivity which, on both sides, has channels formed for distribution of fuel and operating channels covered with operating anode layers, which are then covered with: layers of solid electrolyte, cathode layers and cathode conductive layers, whereby each two-sided cell makes mechanical contact with the adjacent two-sided cells with flexible separators to enable transfer of fuel and catalytic combustions products. Furthermore, inside the thermally insulated chamber, temperature control devices are located, such as heaters, heat absorbers and equipment forcing air circulation within the insulated chamber.

Preferably, the central ceramic anode structure contains inbuilt metallic conductive structures, whereby the metallic conductive structures can be favorably based on nickel.

The clamping bars ensure the pressure between the two-sided cells and the flexible separators. Additionally, the pressure connection of the two-sided cells with flexible separators is sealed with pads preferably made of mica. The external surfaces of clamping bars are preferably covered with ceramic insulating material.

The battery heaters are arranged in parallel to the two-sided cell stacks and are located perpendicularly to the direction of stream of gases circulating inside a thermally insulated chamber. Also, the heat absorbers are arranged in parallel to the two-sided cell stacks and are located perpendicularly to the direction of stream of gases circulating inside a thermally insulated chamber.

The battery is provided with a device, tangential fan, for forcing air circulation inside the thermally insulated chamber.

An alternative embodiment of the battery is provided with a device for forcing air circulation inside the thermally insulated chamber, which is a linear distributor of oxidant streams, and the medium forcing the circulation are streams of fresh oxidant distributed with the distributor and shaped with nozzles.

In certain embodiment, the two-sided cells are electrically connected with metallic tape.

BRIEF DESCRIPTION OF THE DRAWINGS

An exemplary embodiment of the invention is shown in the attached drawings, in which.

Figure 1:
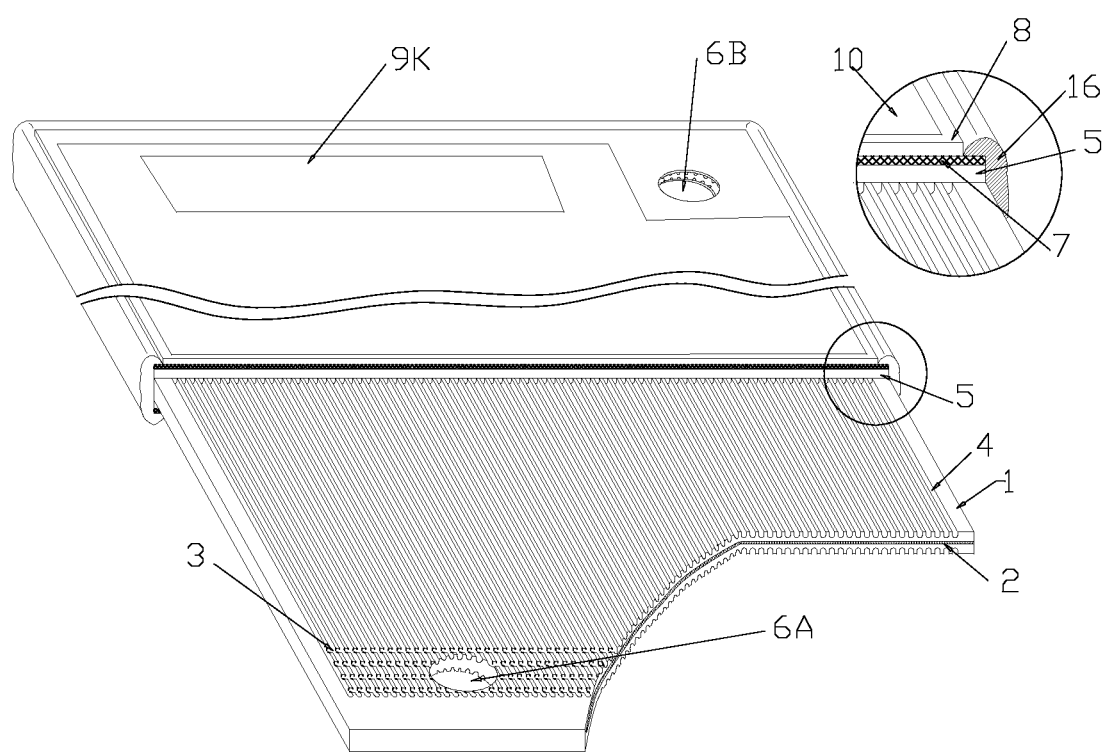
FIG. 1 shows the ceramic structure of the cells of an exemplary embodiment.

In the drawings, the following reference characters are used: DFC: two-sided cell; 1: central ceramic anode structure; 2: embedded metallic conductive structure; 3: distributing channels; 4: operating channels; 5: operating anode layer; 6A/6B: input/output; 7: solid electrolyte; 8: cathode layer; 9A: anode contact field; 9K: cathode contact field; 10: cathode conductive layer; 11: flexible separator; 12: thermally insulated chamber; 13: heater; 14: heat absorber; 15A and 15B: device forcing air circulation; 15A: tangential fan; 15B: linear distributor of oxidant streams; 16: ceramic sealing composite; 17: clamping bar; 18: sealing pad; 19: connection; 20: metallic tape; 21: distributor; 22: fuel line; 23: collector; 24: exhaust line.

DETAILED DESCRIPTION OF THE EMBODIMENTS

Flat two-sided DFC cell, constituting the main part of the battery, which is shown in FIG. 1, comprises the central ceramic anode structure 1, equipped with a central-anode highly-conductive core, preferably comprising embedded metallic nickel-based structures 2.

In the central ceramic anode structure 1, on both sides of it, distributing channels 3 and operating channels 4 are formed which supply fuel to the operating anode layer 5. The operating anode layers 5 are made of porous ceramic material containing zirconia ceramics and nickel. Such layers have a ceramic structure that is the same as or similar to the material constituting the central ceramic anode structure and are permanently bonded to it.

On the surface of the operating anode layers 5, solid electrolyte layers 7 are disposed, which are then covered with cathode layers 8, on which, in turn, cathode conductive layers 10 are applied, serving as the current collecting electrodes.

The flat two-sided DFC cell constitutes a complete autonomous energy converter and is provided with individual input 6A and output 6B, respectively, for fuel distribution and removing combustion products, and is further equipped with electrical contact fields 9A and 9K enabling connection of the electric load. The first contact field 9A has electrical connection, via central ceramic anode structure 1, with the operating anode layers 5. The second contact field 9K has electrical connection, via conducting layer 10, with the cathode layer 8. The cathode conducting layer 10 constitutes a current collector for the cathode 8. It is intended primarily to minimize electric resistance between the cathode 8 and the contact field of the cathode 9K, and simultaneously, enables free oxidant to flow through that layer. The cathode conducting layer 10 is preferably made of porous silver, permeable to gases, and/or has mesh structure.

In normal operating conditions, the flat DFC two-sided cell is fully immersed in oxidant atmosphere. This requires tight protection against direct oxidant inflow to the anode layer, since it degrades the central ceramic anode structure 1. To this end, almost the entire inner surface of the ceramic anode structure 1 is covered with a layer of solid electrolyte 7, and other areas of the inner surface, except for that under the anode contact field 9A, are covered with ceramic sealing compound 16.

Figure 2:
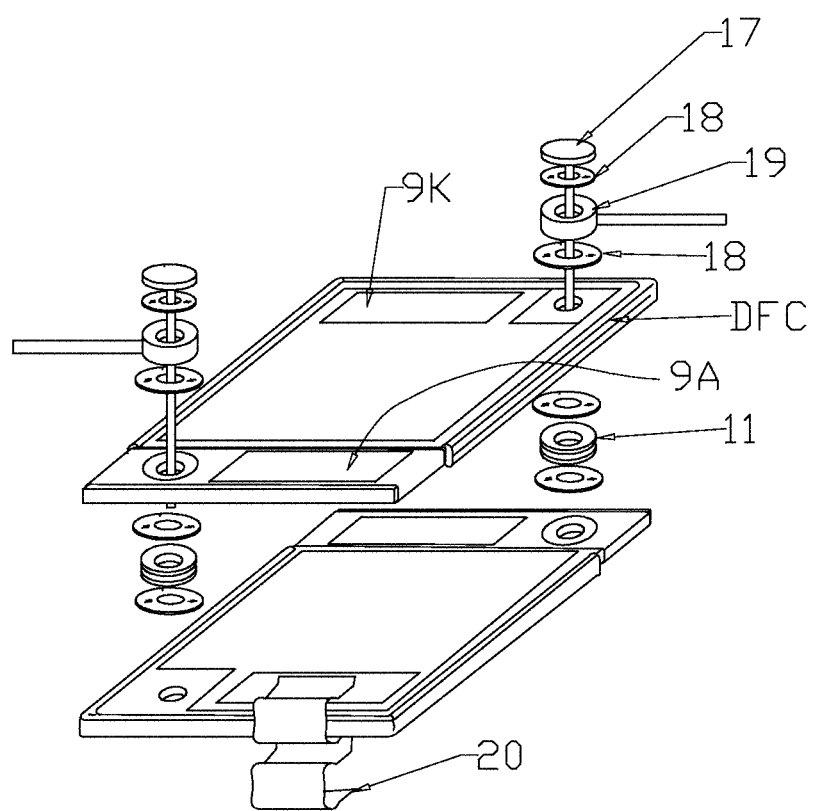
FIG. 2 shows the manner in which cells are connected to form a battery.

FIG. 2 explains the manner of stacking the cells. To provide air flow to the cell cathodes, individual FC two-sided cells are separated from one from another with flexible separators 11. The flexible separators 11 are also intended to transfer fuel to the next adjacent, two-sided DFC cells. The flexible separators 11 compensate also for the inevitable lack of alignment between the planes of the neighboring two-sided DFC cells. The flexible separators are supported with sealing pads 18 intended to ensure that the connections are gas-tight. The two-sided DFC cells in each stack are electrically connected in series with metallic tape 20. All flexible separators 11 and sealing pads 18 are arranged concentrically and are compressed with the clamping bars 17.

The location of the electric contact points of a single cell in the opposite corners of the ceramic structure lengthens the current path both on the anode and cathode sides and results in specific material requirements regarding the electrical conductivity of the current collectors. Since, at the anode side, the function of current collecting electrode is performed by the ceramic anode structure 1, its electrical conductivity is of great importance to the efficiency of the cell. In order to improve the electrical conductivity, conductive nickel layers are embedded with the ceramic core structure. At the same time, the conductivity improvement of the cathode side has been achieved by using sliver-based cathode conductive layers 10.

The design of the battery of fuel cells according to the invention, in which the main operating areas of the cells are separated and make physical contact, on most of its area, only with a stream of oxidant flowing around them, enables fast and safe battery heating with circulation of gases flowing around the battery. This has minimized mechanical stress due to non-uniform heating of the cells, since the neighboring cells contact one another only with metallic separators having some flexibility.

Figure 3A:
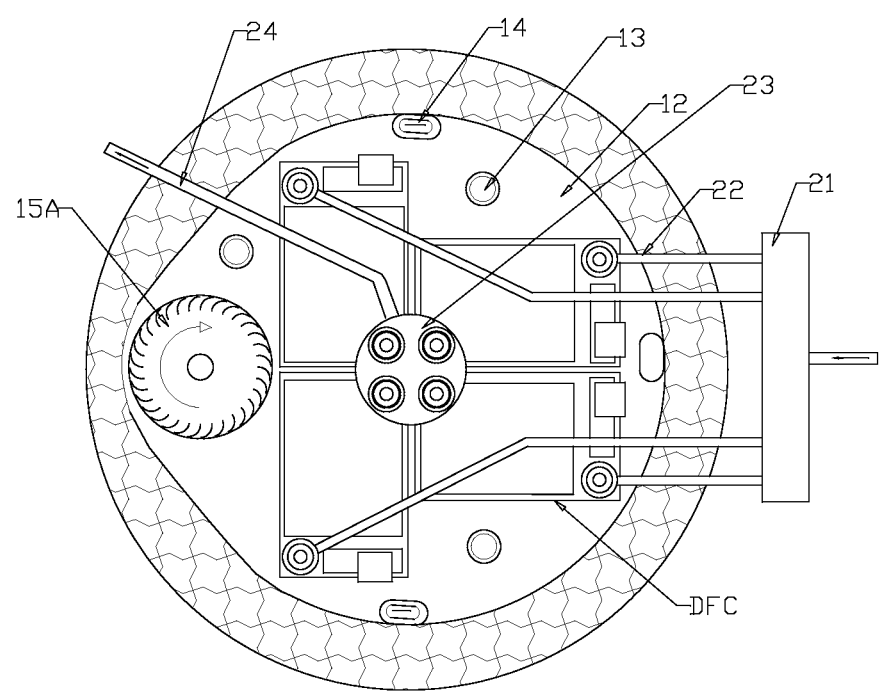
FIG. 3A and FIG. 4 show examples of the electrochemical energy converter.
Figure 3B:
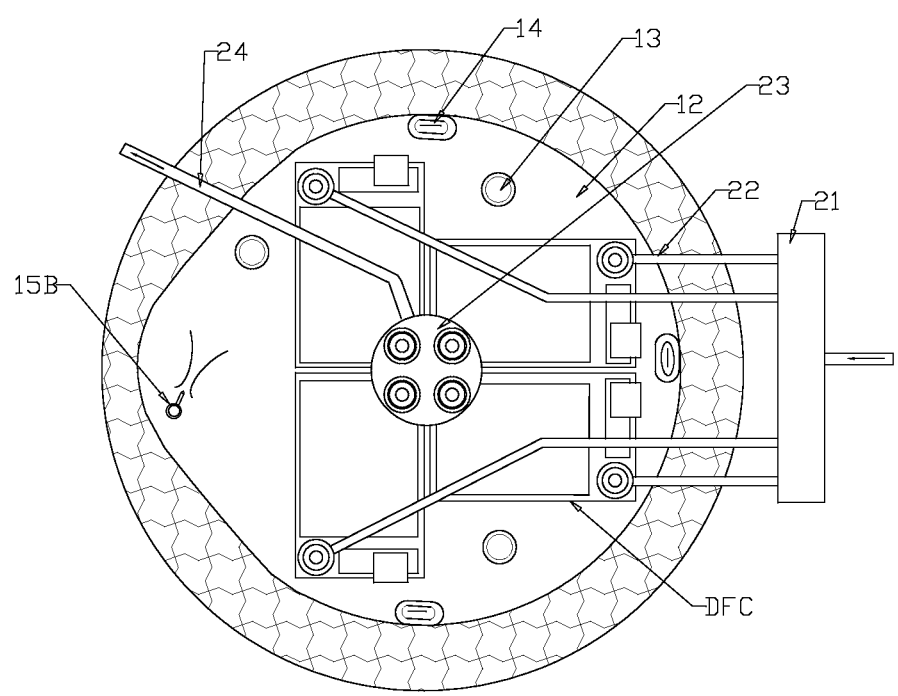
FIG. 3B shows another exemplary embodiment, in which a linear distributor of oxidant streams serves as a stream pump forcing air circulation inside the thermally insulated chamber.
Figure 4:
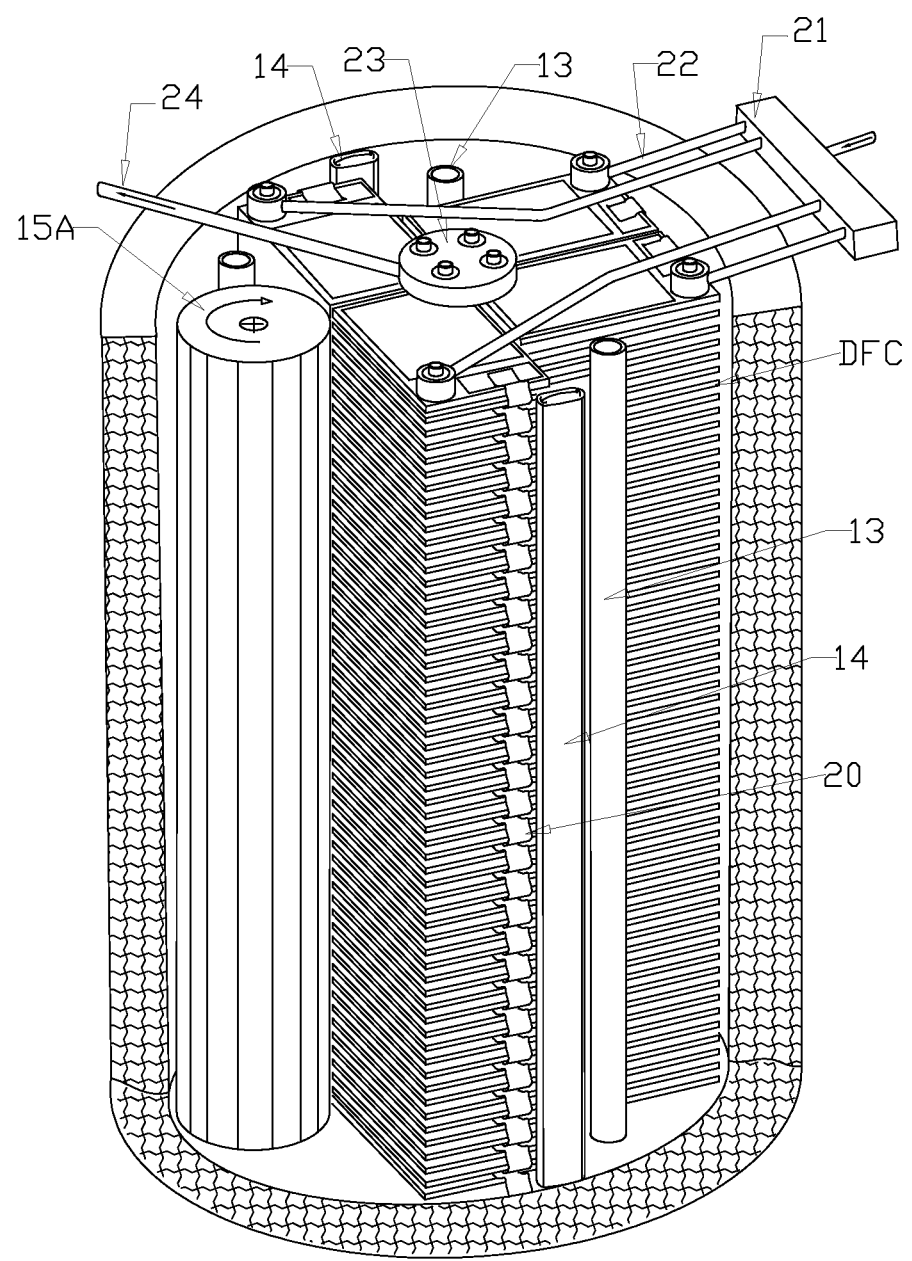

Furthermore, application of a device forcing oxidant circulation 15A or 15B inside the thermally insulated chamber 12 allows for the improvement of heat exchange efficiency between heaters and the battery of fuel cells. That device is particularly useful in the battery start-up phase, when it is necessary to ensure similar temperature of individual two-sided cells during the phase of rapid temperature rise. In the device of the invention, it is possible to use different designs of the gas circulator in the thermally insulated chamber 12. One embodiment of the circulator is based on a tangential fan 15A. (See FIG. 3A and FIG. 4). Another embodiment of the circulator, shown in FIG. 3B, in which gas circulation in the thermally insulated chamber 12 is forced by a linear distributor of fresh oxidant streams 15B, utilizes the Coanda effect.

In such circumstances, it is possible to reduce the battery activation time by multiple times in relation to the start-up time of typical batteries, in which—due to interlocked structure—fast heating results in inevitable stress.

In the battery start up process, additional necessary heat is supplied by cylindrical heaters 13 arranged in parallel to the cell stack. A stream of gases rotating inside the thermally insulated chamber 12 supplies heat to the battery. After heating to about 700° C., the operating battery of fuel cells delivers enough heat to maintain optimum and safe working conditions. During normal operation, constant temperature is maintained at 800° C., and heat excess, after prior switching the heaters 13 off, is removed by heat absorbers located inside the thermally insulated chamber 12, and can be used by other equipment, e.g., water heaters. Circulating stream of gases around the heat absorbers 14 allows efficient heat exchange and maintaining uniform temperature of individual cells of the battery.

The battery heaters 13 are arranged in parallel to the cell stack and are located perpendicularly to the direction of stream of gases circulating inside the thermally insulated chamber. The heaters 13 installed are in a form of extended metallic cylinders, through which streams of heated combustion gas are fed. In an alternative embodiment, it is possible to use electric heaters. Heat absorbers 14 are arranged in parallel to the cell stack and are located perpendicularly to the stream of gases circulating inside the chamber. Heat absorbers 14 are preferably in the shape of reverse U-tubes, through which cooling medium is fed, and this medium transfer heat is used to heat exchangers connected with heat receivers.

The process of battery start up begins from feeding hydrogen to the two-sided DFC cell stack through the distributor 21, fuel lines 22 and connections 19. Then, through the distributing channels 3 and functional channels 4, hydrogen is transferred to the collector 23, from which it is discharged through the exhaust line 24. During the initial low-temperature heating phase, in the absence of catalytic combustion process, the discharged hydrogen is burnt in a flame and, during normal operation of the battery, hydrogen residues in the exhaust gases are burnt in a flame. Cell stacks are heated by three metallic cylindrical heaters 13, through the inner holes of which hot combustion gases from three independent gas burners are forced. At the same time, during the heating process, similar temperature is maintained for all of the two-sided DFC cells with the device forcing air circulation 15A or 15B.

After the cell stacks have been heated to about 700° C., gas burners are shut off, and heat absorbers 14 are started with a cooling medium flow being forced through them. The flow intensity of the cooling medium is controlled so as to maintain constant temperature of 800° C. in the thermally insulated chamber 12. Although, the battery of fuel cells allows higher current output to be achieved at higher operating temperatures (e.g. 900° C.)—the compromise value of 800° C. has been set to maintain a safety margin and to prevent the melting of the silver-based components, such as the tape 20, porous cathode conductive layer 10, and contact fields of the anode 9A and 9B.

EXAMPLES

The main component of the battery is a two-sided cell. Its manufacturing process is described below.

Example 1

1. Making the central ceramic structure
   a. Lamination of 6 layers of anode membrane (ESL42421), T=80° C., P=500 atm.
   b. Making operating channels.
2. Lamination of operating anode layers (ESL 42421) and $ZrO_2$ electrolyte (42400).
3. Assembly of laminates.
4. Drying, 370° C.
5. Thermal processing of assembled laminates, 1550° C.
6. Printing of cathode layers, LSCF, (ESL4421).
7. Thermal processing of cathode layers, 1100° C.
8. Printing of contact and conductive layers.
9. Application of edge sealing composite, (ESL4916).
10. Thermal processing of contact layers and sealing composite, 900° C.
11. Making entry holes.
12. Reducing the central ceramic anode structure in hydrogen atmosphere, 800° C.

Example 2

1. Making the central ceramic structure
   Lamination of 4 layers of anode membrane (ESL42421) and three layers of nickel mesh, T=80° C., P=500 Atm.
   Drying and thermal processing; 370° C., 1600° C.
   Lamination on both sides of anode membrane (ESL42421).
   Drying and thermal processing; 370° C., 1,300° C.
   Making operating channels.
2. Lamination of operating anode layers (ESL 42421) and $ZrO_2$ electrolyte (42400).
3. Assembly of laminates.
4. Drying, 370° C.
5. Thermal processing of assembled laminates, 1600° C.
6. Printing of cathode layers, LSCF, (ESL4421).
7. Thermal processing of cathode layers, 1100° C.
8. Printing of contact and conductive layers.
9. Application of edge sealing composite, (ESL4916).
10. Thermal processing of contact layers and sealing composite, 900° C.
11. Making entry holes.
12. Reducing the central ceramic anode structure in hydrogen atmosphere, 800° C.

The invention claimed is:

1. A battery comprising:
   at least one stack of interconnected flat two-sided fuel cells arranged inside a thermally insulated chamber, each of said two-sided fuel cells comprising a central ceramic anode structure having high electrical conductivity, and
   temperature-controlling elements located inside said thermally insulated chamber,
   wherein
   each of said two-sided fuel cells is made in a form of a ceramic plate having individual connections for the supply and drainage of fluids and discharge of electric energy,
   said anode structure comprises on both of its sides fuel distributing channels and operating channels,
   said fuel distributing channels and said operating channels are covered with operating anode layers, and said operating anode layers are sequentially covered with solid electrolyte layers, cathode layers, and cathode conductive layers, and
   each of said two-sided fuel cells makes mechanical contact with adjacent two-sided fuel cells via flexible separators, said flexible separators being adapted to transfer of fuel and catalytic combustion products.

2. The battery of claim 1, wherein said temperature-controlling element is one or more heaters, one or more heat absorbers, or one or more devices forcing air circulation.

3. The battery of claim 2, wherein said heaters are arranged in parallel to said two-sided cell stacks and are located perpendicularly to a direction in which a stream of gases circulates inside said thermally insulated chamber.

4. The battery of claim 2, wherein said heat absorbers are arranged in parallel to said two-sided cell stacks and are located perpendicularly to a direction in which a stream of gases circulates inside said thermally insulated chamber.

5. The battery of claim 2, wherein said device forcing air circulation is a tangential fan.

6. The battery of claim 2, wherein said device forcing air circulation is a linear distributor of oxidant streams, and a medium forcing circulation are streams of fresh oxidant distributed with a distributor and shaped with nozzles.

7. The battery of claim 1, wherein said central ceramic anode structure comprises embedded metallic conductive structures.

8. The battery of claim 7, wherein said metallic conductive structures embedded are based on nickel.

9. The battery of claim 1, wherein a pressure of said two-sided cells against said flexible separators is ensured by clamping bars.

10. The battery of claim 1, wherein said clamping bars have outer surfaces coated with a ceramic insulating material.

11. The battery of claim 1, wherein a pressure connection of said two-sided cells with said flexible separators is sealed with sealing pads.

12. The battery of claim 11, wherein said sealing pads are mica.

13. The battery of claim 1, wherein said two-sided cells are electrically bonded via a metallic tape.

\* \* \* \* \*